United States Patent
Sturges et al.

(10) Patent No.: US 6,453,385 B1
(45) Date of Patent: *Sep. 17, 2002

(54) CACHE SYSTEM

(75) Inventors: Andrew Craig Sturges, Bath; David May; Glenn Farrall, both of Bristol, all of (GB); Bruno Fel, Sassenage (FR); Catherine Barnaby, Bristol (GB)

(73) Assignee: SGS-Thomson Microelectronics Limited, Almondsbury Bristol (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/014,315

(22) Filed: Jan. 27, 1998

(30) Foreign Application Priority Data

Jan. 30, 1997 (GB) ............................................. 9701960
Dec. 1, 1997 (GB) ............................................. 9725437

(51) Int. Cl.[7] ............................................. G06F 12/00
(52) U.S. Cl. ........................ 711/129; 711/133; 711/173
(58) Field of Search ................................ 711/129, 133, 711/173; 709/250; 710/100

(56) References Cited

U.S. PATENT DOCUMENTS

| | | | | |
|---|---|---|---|---|
| 4,654,782 A | * | 3/1987 | Bannai et al. | 71/3 |
| 4,905,141 A | * | 2/1990 | Brenza | 711/129 |
| 5,487,162 A | * | 1/1996 | Tanaka et al. | 711/145 |
| 5,584,014 A | * | 12/1996 | Nayfeh et al. | 711/134 |
| 5,796,944 A | * | 8/1998 | Hill et al. | 709/250 |
| 5,875,464 A | * | 2/1999 | Kirk | 711/129 |

FOREIGN PATENT DOCUMENTS

GB  2 311 880  * 10/1997  ........... G06F/12/08

OTHER PUBLICATIONS

European Search Report for European application No. 98 30 0518, search completed May 8, 1998.*

Standard Search Report for application No. RS 99958, search completed Feb. 20, 1998.*

European Search Report for European application No. 98 30 0515, search completed May 8, 1998.*

International Search Report for application No. PCT/GB98/00268, filed Jan. 29, 1998.*

Dongwook, K., et al., A Partitioned On–Chip Virtual Cache for Fast Processors, Journal of System Arch., vol. 43, No. 8, May 1997, pp. 519–531.*

Mueller F., Compiler Support for Software–Based Cache Partitioning, ACM Sigplan Notices, vol. 30, No. Nov. 1, 1995, pp. 125–133.*

Kirk D.B., Smart (Stragetic Memory Allocation for Real–Time) Cache Design, Proceedings of the Rea Times Systems Symposium, Dec. 5, 1989, pp. 229–237.*

Standard Search Report performed by the European Patent Office, dated Oct. 16, 1997.

Compiler Support for Software–Based Cache Partitioning, Frank Mueller, ACM SigPlan Notices, vol. 30 No. 11, Nov. 1995, pp. 125–133.

* cited by examiner

Primary Examiner—Do Hyun Yoo
Assistant Examiner—Nasser Moazzami
(74) Attorney, Agent, or Firm—Wolf, Greenfield & Sacks, P.C.; James H. Morris; Robert A. Skrivanek, Jr.

(57) ABSTRACT

A cache system and method of operating are described in which a cache is connected between a processor and a main memory of a computer. The cache system includes a cache memory having a set of cache partitions. Each cache partition has a plurality of addressable storage locations for holding items fetched from said main memory for use by the processor. The cache system also includes a cache refill mechanism arranged to fetch an item from the main memory and to load said item into the cache memory at one of said addressable storage locations in a cache partition wich depends on the address of said item in the main memory. This is achieved by a cache partition access table holding in association with addresses of items to be cached respective multi-bit partition indications identifying one or more cache partition into which the item is to be loaded.

20 Claims, 5 Drawing Sheets

CACHE SYSTEM

FIELD OF THE INVENTION

The present invention relates to a cache system for operating between a processor and a main memory of a computer.

BACKGROUND TO THE INVENTION

As is well known in the art, cache memories are used in computer systems to decrease the access latency to certain data and code and to decrease the memory bandwidth used for that data and code. A cache memory can delay, aggregate and reorder memory accesses.

A cache memory operates between a processor and a main memory of a computer. Data and/or instructions which are required by the process running on the processor can be held in the cache while that process runs. An access to the cache is normally much quicker than an access to main memory. If the processor does not locate a required data item or instruction in the cache memory, it directly accesses main memory to retrieve it, and the requested data item or instruction is loaded into the cache. There are various known systems for using and refilling cache memories.

In order to rely on a cache in a real time system, the behaviour of the cache needs to be predictable. That is, there needs to be a reasonable degree of certainty that particular data items or instructions which are expected to be found in the cache will in fact be found there. Most existing refill mechanisms will normally always attempt to place in the cache a requested data item or instructions. In order to do this, they must delete other data items or instructions from the cache. This can result in items being deleted which were expected to be there for later use. This is particularly the case for a multi-tasking processor, or for a processor which has to handle interrupt processes or other unpredictable processes.

It is an object of the present invention to provide a cache system which obviates or reduces this disadvantage and provides greater predictability of caching behaviour.

SUMMARY OF THE INVENTION

According to one aspect of the present invention there is provided a cache system for operating between a processor and a main memory of a computer, the cache system comprising:
  a cache memory having a set of cache partitions, each cache partition comprising a plurality of addressable storage locations for holding items fetched from said main memory for use by the processor,
  a cache refill mechanism arranged to fetch an item from the main memory and to load said item into the cache memory at one of said addressable storage locations;
  a cache partition access table holding in association with addresses of items to be cached respective multi-bit partition indicators identifying into which cache partition the item may be loaded,
  wherein the cache refill mechanism is operable to allocate to each said item fetched from the main memory one or more of said cache partitions in dependence on the address of said item in the main memory.

It is thus quite possible for an item to have access to more than one partition of the cache, or indeed for an item not to be allowed access to the cache at all.

In the described embodiment, each address in main memory comprises a page number and a line in page number, the page numbers being held in a look-up table in association with their respective partition indicators.

In a virtual addressing system, the processor issues addresses comprising a virtual page number and line in page number. In that event, the system can comprise a translation look aside buffer for translating the virtual page number to a real page number for accessing the main memory, the translation look aside buffer also holding respective partition indicators in association with the real page numbers for identifying the cache partition into which the addressed item is to be loaded.

The line in page number of the items addressed can be used to identify the address storage location within the cache partition into which the item is to be located. That is, each cache partition is direct-mapped. It will be apparent that it is not necessary to use all of the end bits of the items address as the line in page number, but merely a set of appropriate bits. These will normally be near the least significant end of the address.

One or more cache partitions may be allocated to a page in main memory.

The system can include a cache access circuit which accesses items from the cache memory according to the address in main memory of said items and regardless of the cache partition in which the item is held in the cache memory. That is, the partition indicator is only used on refill and not on look-up. Thus, a cached item can be retrieved from its partition even if subsequent to its caching that partition is now allocated to a different set of addresses.

According to another aspect of the invention there is provided a method of operating a cache memory arranged between a processor and a main memory of a computer, wherein, when the processor requests an item from main memory using an address in main memory for said item and that item is not held in the cache memory, said item is fetched from the main memory and loaded into one of a plurality of addressable storage locations in the cache memory, the addressable storage locations being arranged as a set of cache partitions and wherein each address is associated with a multi-bit partition indicator identifying into which cache partition the item may be loaded so that one or more of said cache partitions is allocated to said item in dependence on the address of said item in main memory.

The main memory can hold a plurality of processes, each process including one or more sequence of instructions held at addresses in the main memory within a common page number. Cache partitions can be allocated by associating each cache partition with page numbers of a particular process in the main memory.

The number of addressable storage locations in each cache partition can be alterable. Also, the association of cache partitions to page numbers can be alterable while a process using these page numbers is being run by the processor.

The following described embodiment illustrates a cache system which gives protection of the contents of the cache against unexpected eviction by reading from or writing to cache lines from other pages of data which are placed in other partitions. It also provides a system in which the contents of the cache may be predicted.

For a better understanding of the present invention and to show how the same may be carried into effect, reference will now be made by way of example to the accompanying drawings.

DESCRIPTION OF THE PREFERRED EMBODIMENTS

Figure 1:
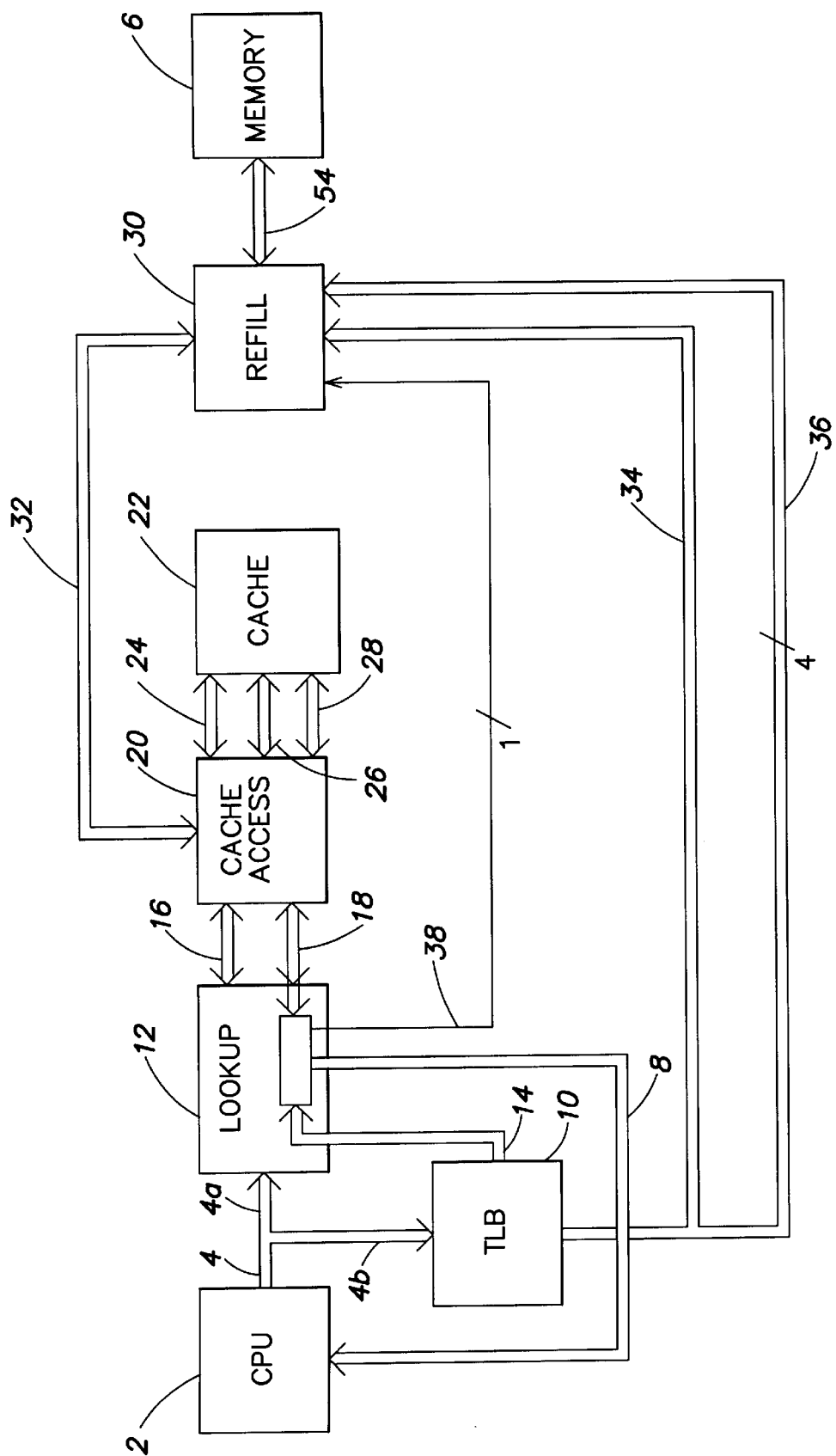
FIG. 1 is a block diagram of a computer incorporating a cache system.

FIG. 1 is a block diagram of a computer incorporating a cache system. The computer comprises a CPU 2 which is connected to an address bus 4 for accessing items from a main memory 6 and to a data bus 8 for returning items to the CPU 2. Although the data bus 8 is referred to herein as a data bus, it will be appreciated that this is for the return of items from the main memory 6, whether or not they constitute actual data or instructions for execution by the CPU. The system described herein is suitable for use on both instruction and data caches. As is known, there may be separate data and instruction caches, or the data and instruction cache may be combined. In the computer described herein, the addressing scheme is a so-called virtual addressing scheme. The address is split into a line in page address 4a and a virtual page address 4b. The virtual page address 4b is supplied to a translation look-aside buffer (TLB) 10. The line in page address 4a is supplied to a look-up circuit 12. The translation look-aside buffer 10 supplies a real page address 14 converted from the virtual page address 4b to the look-up circuit 12. The look-up circuit 12 is connected via address and data buses 16,18 to a cache access circuit 20. Again, the data bus 18 can be for data items or instructions from the main memory 6. The cache access circuit 20 is connected to a cache memory 22 via an address bus 24, a data bus 26 and a control bus 28 which transfers replacement information for the cache memory 22. A refill engine 30 is connected to the cache access circuit 20 via a refill bus 32 which transfers replacement information, data items (or instructions) and addresses between the refill engine and the cache access circuit. The refill engine 30 is itself connected to the main memory 6.

The refill engine 30 receives from the translation look-aside buffer 10 a full real address 34, comprising the real page address and line in page address of an item in the main memory 6. The refill engine 30 also receives a partition indicator from the translation look-aside buffer 10 on a four bit bus 36. The function of the partition indicator will be described hereinafter.

Finally, the refill engine 30 receives a miss signal on line 38 which is generated in the look-up circuit 12 in a manner which will be described more clearly hereinafter.

The cache memory 22 described herein is a direct mapped cache. That is, it has a plurality of addressable storage locations, each location constituting one row of the cache. Each row contains an item from main memory and the address in main memory of that item. Each row is addressable by a row address which is constituted by a number of bits representing the least significant bits of the address in main memory of the data items stored at that row. For example, for a cache memory having eight rows, each row address would be three bits long to uniquely identify those rows. For example, the second row in the cache has a row address 001 and thus could hold any data items from main memory having an address in the main memory which ends in the bits 001. Clearly, in the main memory, there would be many such addresses and thus potentially many data items to be held at that row in the cache memory. Of course, the cache memory can hold only one data item at that row at any one time.

Operation of the computer system illustrated in FIG. 1 will now be described but as though the partition indicator was not present. The CPU 2 requests an item from main memory 6 using the address in main memory and transmits that address on address bus 4. The virtual page number is supplied to the translation look-aside buffer 10 which translates it into a real page number 14 according to a predetermined virtual to real page translation algorithm. The real page number 14 is supplied to the look-up circuit 12 together with the line in page number 4a of the original address transmitted by the CPU 2. The line in page address is used by the cache access circuit 20 to address the cache memory 22. The line in page address includes a set of least significant bits (not necessarily including the end bits) of the main address in memory which are equivalent to the row address in the cache memory 22. The contents of the cache memory 22 at the row address identified by the line in page address, being a data item (or instruction) and the address in main memory of the data item (or instruction), are supplied to the look-up circuit 12. There, the real page number of the address which has been retrieved from the cache memory is compared with the real page number which has been supplied from the translation look-aside buffer 10. If these addresses match, the look-up circuit indicates a hit which causes the data item which was held at that row of the cache memory to be returned to the CPU along data bus 8. If however the real page number of the address which was held at the addressed row in the cache memory 22 does not match the real page number supplied from the translation look-aside buffer 10, then a miss signal is generated on line 38 to the refill engine 30. It is the task of the refill engine 30 to retrieve the correct item from the main memory 6, using the real address which is supplied from the translation look-aside buffer 10 on bus 34. The data item, once fetched from main memory 6 is supplied to the cache access circuit 20 via the refill bus 32 and is loaded into the cache memory 22 together with the address in main memory. The data item itself is also returned to the CPU along data bus 8 so that the CPU can continue to execute. In a direct mapped cache memory as outlined above, it will be apparent that the data item and its address recalled from the main memory 6 will be loaded into the storage location from which the data item was originally accessed for checking. That is, it will be over-written into the only location which can accept it, having a row address matching the set of least significant bits in the line in page address in main memory. Of course, the page number of the data item originally stored in the cache memory and the data item which is now to be loaded into it are different. This "one to one mapping" limits the usefulness of the cache.

Figure 2:
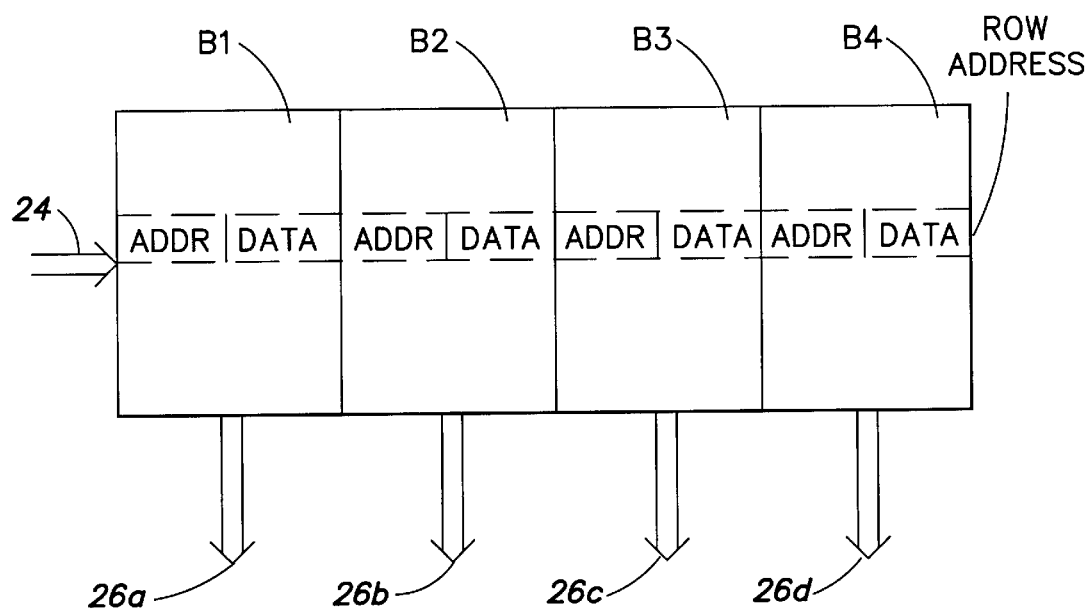
FIG. 2 is a sketch illustrating a four way set associative cache.

To provide a cache system with greater flexibility, an n-way set associative cache memory has been developed. An example of a 4-way set associative cache is illustrated in FIG. 2. The cache memory is divided into four banks B1, B2, B3, B4. The banks can be commonly addressed row-wise by a common row address, as illustrated schematically for one row in FIG. 2. However, that row contains four cache entries, one for each bank. The cache entry for bank B1 is output on bus 26a, the cache entry for bank B2 is output on bus 26b, and so on for banks B3 and B4. Thus, this allows four cache entries for one row address (or line in page address). Each time a row is addressed, four cache entries are output and the real page numbers of their addresses are compared with the real page number supplied from the translation look-aside buffer 10 to determine which entry is the correct one. If there is a cache miss upon an attempted access to the cache, the refill engine 30 retrieves the requested item from the main memory 6 and loads it into the correct row in one of the banks, in accordance with a refill algorithm which is based on, for example, how long a particular item has been held in the cache, or other program parameters of the system. Such replacement algorithms are known and are not described further herein.

Nevertheless, the n-way set associative cache (where n is the number of banks and is equal to four in FIG. 2), while being an improvement on a single direct mapped system is still inflexible and, more importantly, does not allow the behaviour of the cache to be properly predictable.

The system described herein provides a cache partitioning mechanism which allows the optimisation of the computer's use of the cache memory by a more flexible cache refill system.

Figure 7:
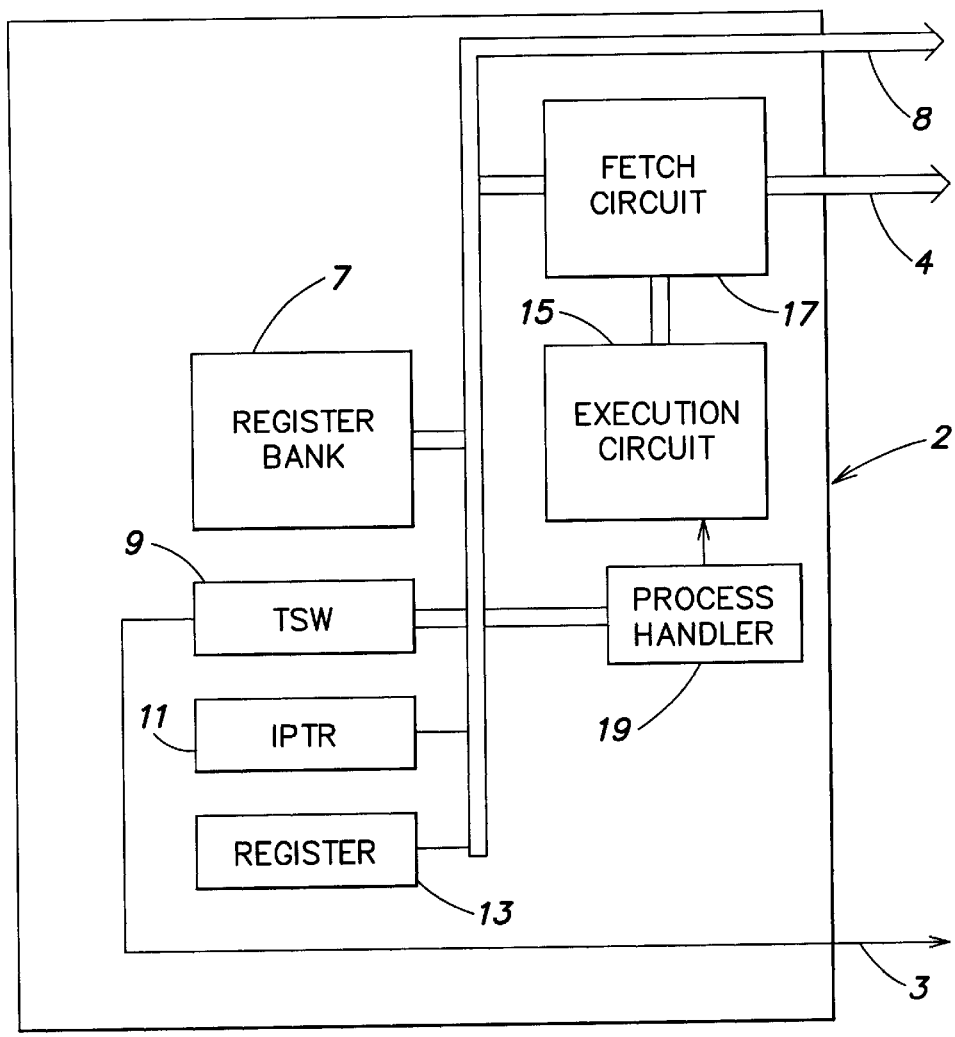
FIG. 7 is a schematic block diagram of a CPU.

FIG. 7 is a schematic block diagram of a CPU 2 using the computer of FIG. 1. The CPU 2 comprises an execution circuit 15 which is connected to a fetch circuit 17 which is responsible for addressing memory via the memory bus 4 and retrieving data and instructions via the data bus 8. A set of general purpose registers 7 is connected to the execution circuit 15 for holding data and instructions for use in executing a process. In addition, a set of special registers are provided, denoted by reference numerals 9, 11 and 13. There may be any number of special purpose registers and by way of example register 11 holds the instruction pointer which identifies the line of code which is currently being executed. In addition, special register 9 holds a thread status word which defines the status of a process being executed by the CPU 2. The execution circuit 15 is capable of executing one process or sequence of instructions at any one time. However, it is equally capable of interrupting that process and starting to execute another process before the first process has finished executing. There are many reasons why a process currently being executed by the execution circuit 15 may be interrupted. One is that a higher priority interrupt process is to be executed immediately. Another is that the process being executed is currently awaiting data with a long latency, so that it is more efficient for the execution circuit to commence executing a subsequent process while the first process is waiting for that data. When the data has been received, the first process can be rescheduled for execution. The execution of concurrent processes is known per se and is managed by a process handler 19.

Each process is executed under a so-called "thread" of control. A thread has the following state:
an instruction pointer which indicates where in the process the thread has advanced to,
a jump pointer which indicates where the process will branch to next,
a set of general purpose registers 7 which contain immediately accessible values,
the mapping of virtual addresses to physical addresses,
the contents of memory accessible through the virtual addresses,
control registers accessible by the thread, and
optionally other values such a floating point rounding mode, whether the thread has kernel privileges etc.

Some of the above state is specified by a small set of values which is referred to herein as thread status word and which is held in the thread status word register 9. The thread status word specifically holds information about:
whether the thread is in kernel mode or not,
which virtual address space the thread can access,
the floating point flags, trap enables and modes,
debug information, and
trap optimisation information.

The format of the thread status word is defined in Table I.

TABLE I

| Name | Bits[a] | Size | Description |
| --- | --- | --- | --- |
| TSW.FPFLAG | 0–7 | 8 | Floating point exception flags. |
| TSW.FPTRAP | 8–15 | 8 | Floating point exception traps. |
| TSW.FPMODE | 16–19 | 4 | Floating point modes. |
|  | 20–31 |  | Reserved. |
| TSW.USER | 32 | 1 | Kernel mode (0)/user mode (1) |
| TSW.SINGLE | 33 | 1 | Single step mode. |
| TSW.TLB | 34 | 1 | First level TLB miss handler indicator. |
| TSW.WATCH | 35 | 1 | Watchpoints enabled. |
| TSW.ENABLE | 36 | 1 | Trap enable. |
|  | 37–47 | 11 | Reserved. |
| TSW.GROUP | 48–55 | 8 | Group number. |
|  | 56–63 |  | Reserved. |

Figure 3:
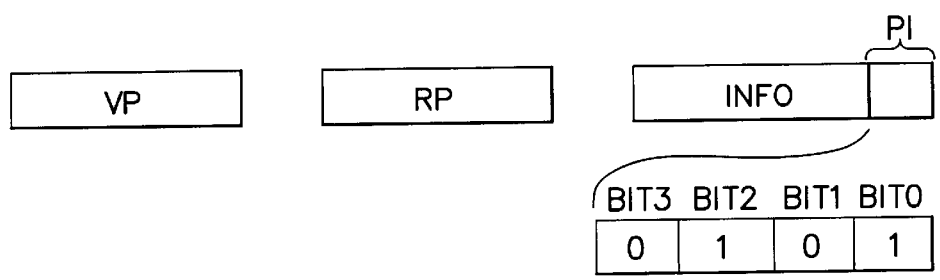
FIG. 3 is an example of an entry in a translation look aside buffer.

In the translation look-aside buffer 10 in the system described herein, each TLB entry has associated with the virtual page number, a real page number and an information sequence. An example entry is shown in FIG. 3, where VP represents the virtual page number, RP represents the real page number and INFO represents the information sequence. The information sequence contains various information about the address in memory in a manner which is known and which will not be described further herein. However, according to the presently described system the information sequence additionally contains a partition indicator PI, which in the described embodiment is four bits long. Thus, bits 0 to 3 of the information sequence INFO constitute the partition indicator.

Figure 8:
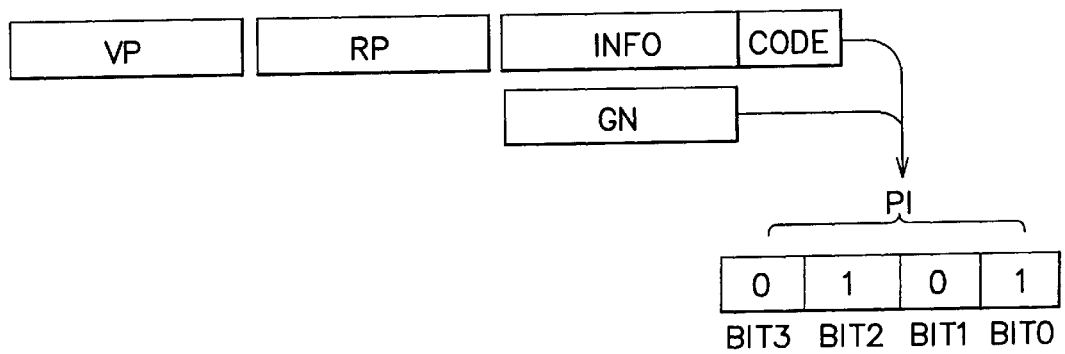
FIG. 8 is an example of an entry in a TLB in a second embodiment.

An alternative arrangement for the TLB entry is illustrated in FIG. 8. As can be seen from Table I, the thread status word includes an 8 bit group number. This is used as described in the following to generate the partition indicator for allocating cache partitions.

In the translation look-aside buffer 10, each TLB entry has associated with the virtual page number, a real page number and an information sequence. The information sequence contains various information about the address in memory in a manner which is known and which will not be described further herein. However, in this embodiment the information sequence additionally contains a partition code which generates a partition indicator PI dependent on the group number and the virtual page number. This is illustrated diagrammatically in FIG. 8, where VP represents the virtual page number, RP represents the real page number, GN represents the group number and INFO represents the information sequence. In the described embodiment PI is four bits long.

The partition indicator gives information regarding the partition into which the data item may be placed when it is first loaded into the cache memory 22. For the cache structure illustrated in FIG. 2, each partition can constitute one bank of the cache. In the partition indicator, each bit refers to one of the banks. The value of 1 in bit j of the partition indicator means that the data in that page may not be placed in partition j. The value of 0 in bit j means that the data in that page may be placed in partition j. Data may be placed in more than one partition by having a 0 in more than one bit of the partition indicator. A partition indicator which is all zeros allows the data to be placed in any partition of the cache. A partition indicator which is all ones does not allow any data items to be loaded into the cache memory. This could be used for example for "freezing" the contents of the cache, for example for diagnostic purposes.

In the example given in FIG. 3, the partition indicator indicates that replacement of data items which have that real page number in main memory may not use banks B1 or B3 but may use banks B2 or B4.

It is quite possible to allocate more than one bank to a page. In that case, if the line in page address has more bits than the row address for the cache, the partitions would behave as a k-way set associative cache, where k partitions are allocated to a page. Thus, in the described example the real page number of FIG. 3 can use banks B2 and B4. However, it may not use banks B1 and B3.

The partition information is not used on cache look-up, but only upon cache replacement or refill. Thus, the cache access can locate data items held anywhere in the cache memory, whereas a replacement will only replace data into the allowed partitions for that page address.

Figure 4:
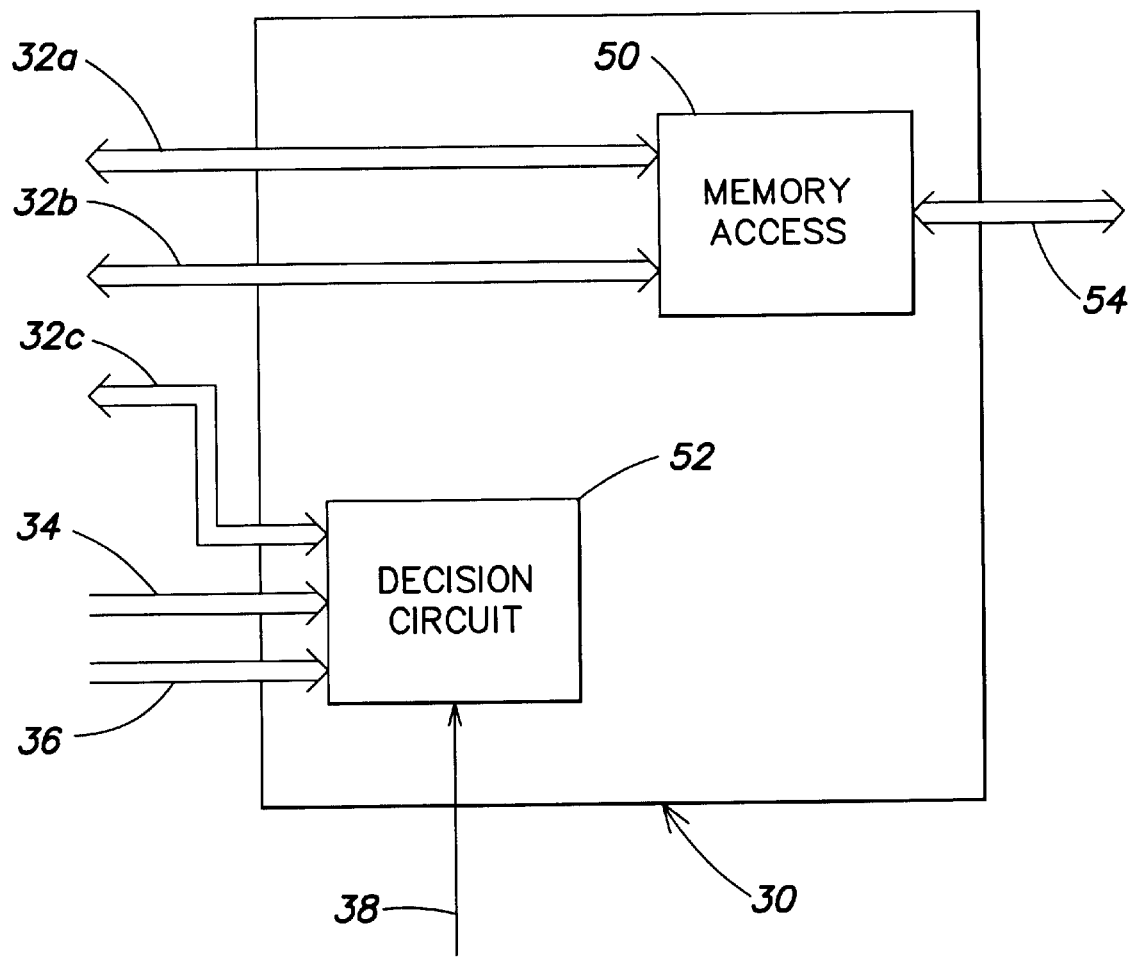
FIG. 4 is a block diagram of the refill engine.

FIG. 4 illustrates in more detail the content of the refill engine 30. The refill bus 32 is shown in FIG. 4 as three separate buses, a data bus 32a, an address bus 32b and a bus 3c carrying replacement information. The address and data buses 32b and 32a are supplied to a memory access circuit 50 which accesses the main memory via the memory bus 54. The replacement information is fed to a decision circuit 52 which also receives the real address 34, the partition indicator PI on bus 36 and the miss signal 38. The decision circuit 52 determines the proper partition of the cache into which data accessed from the main memory is to be located.

The partition indicator PI can be set in the TLB like any other TLB entry. In the described example, the partition indicators are set by kernel mode software running on the CPU 2 and it is the responsibility of that kernel mode software to ensure that pages which should not be placed in a particular cache partition do not have their partition indicator bits set for that partition. However, a user may alter partitions by requesting that the cache partitions be altered. In that event, the CPU 2 would change to kernel mode to implement the request, change the TLB entries accordingly and then return to the user mode to allow the user to continue. Thus, a user can alter the partitioning behaviour of the cache, thus providing much greater flexibility than has hitherto been possible.

Figure 5:
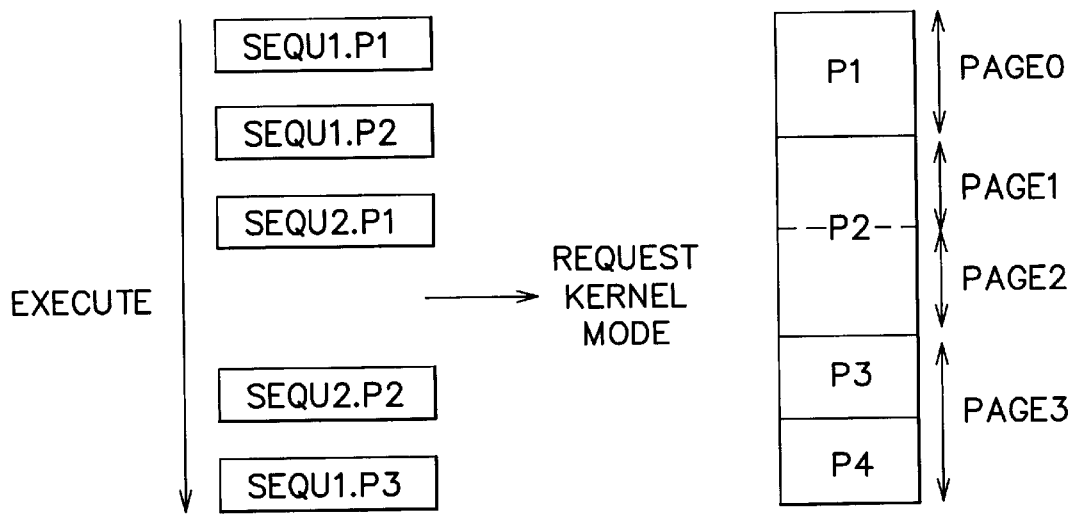
FIG. 5 is a diagram illustrating the operation of a multi-tasking processor.

The cache partitioning mechanism described herein is particularly useful for a multi-tasking CPU. A multi-tasking processor is capable of running more than one process "simultaneously". In practice, the processor executes part of a process and, when that process is halted for some reason, perhaps in need of data or a stimulus to proceed, the processor immediately begins executing another process. Thus, the processor is always operating even when individual processes may be held up waiting for data or another stimulus to proceed. FIG. 5 illustrates diagrammatically such a situation. On the left hand side of FIG. 5 is illustrated the sequence which a processor may undertake to run different processes P1, P2, P3, P4. On the right hand side of FIG. 5 is an illustration of where these processes may expect their data to be held in memory. Thus, the data for the process P1 are held on page 0. The data for process P2 are held on pages 1 and 2. Data for processes P3 and P4 share page 3. In the example, the processor executes a first sequence of process P1, a first sequence of process P2, a second sequence of process P1, a second sequence of process P2 and then a first sequence of process P3. When the second sequence of the process P1 has been executed, the process P1 has been fully run by the processor. It will readily be apparent that in a conventional cache system, once the processor has started executing the first sequence of the process P2, and is thus requesting accesses from page 1, the data items and instructions in these lines will replace in the cache the previously stored data items and instructions from page 0. However, these may soon again be required when the second sequence of the process P1 is executed.

Figure 6:
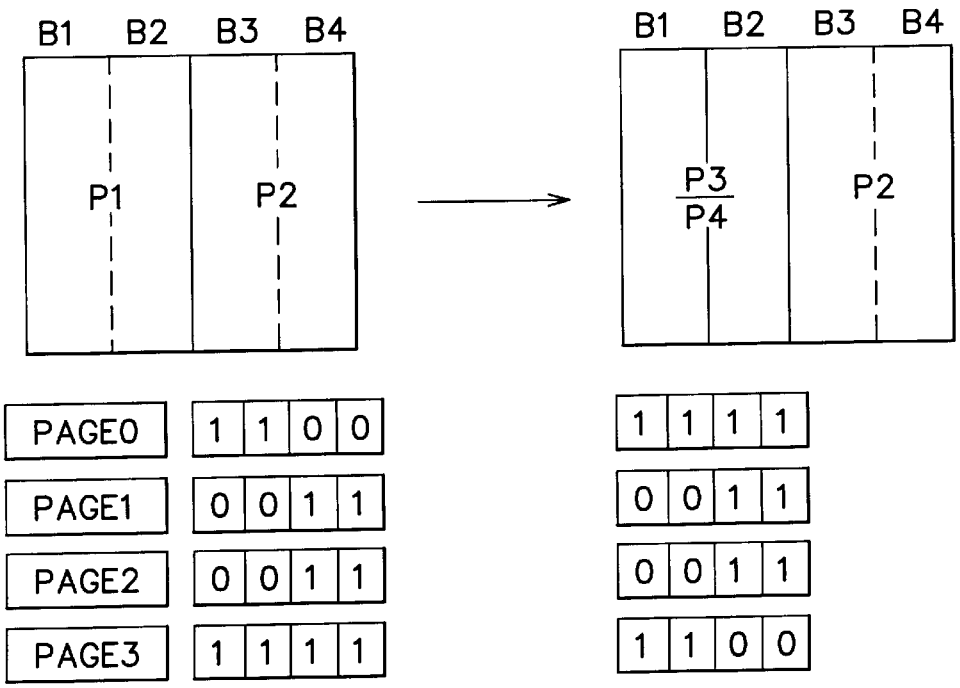
FIG. 6 is a diagram illustrating the alteration in caching behaviour for the system of FIG. 5.

The cache partitioning mechanism described herein avoids the timing delays and uncertainties which can result from this. FIG. 6 shows the partitioning of the cache while the processor is running process P1, and the change in the partitioning when the processor switches to running P3, etc. FIG. 6 also shows the TLB cache partition indicators for each case. Thus, on the left hand side FIG. 6 shows the cache partitioned while the processor is running processes P1 and P2. The process P1 may use banks B1 and B2 of the cache, but may not use banks B3 and B4. Conversely, the process P2 may use banks B3 and B4, but not banks B1 and B2. This can be seen in the TLB entries below. That is, page 0 has a cache partition indicator allowing it to access banks B1 and B2, but not B3 and B4. Pages 1 and 2 have cache partition indicators allowing them to access banks B3 and B4 but not B1 and B2. Page 3 has a cache partition indicator which prevents it from accessing the cache. Thus, any attempt by the processor to load data items from the process P3 into the cache would be prohibited. For the described process sequence, this however is not a disadvantage because, as it can be seen, the processor is not intending to execute any part of the process P3 until it has finished executing process P1. If it did for some reason have to execute P3, the only downside would be that it would have to make its accesses from direct memory and would not be allowed use of the cache.

When the process P1 has finished executing, the processor can request kernel mode to allow it to alter the cache partition indicators of the TLB. In the described embodiment, kernel processes do not have to access the cache. Instead they modify the TLB entries for the partition indicators to modify the behavior of the cache. The change is illustrated on the right hand side of FIG. 6. Thus, now the cache partition indicators prevent the process P1 from using the cache at all, but allocate banks B1 and B2 to the processes P3 and P4, by altering the cache partition indicator for page 3 so that it can access these banks of the cache. Thus, when the processor is expecting to execute the process P3, it now has a cache facility.

It will be appreciated that the present invention is not restricted to the specifically described embodiment above. Some particular possible variations are mentioned below, but this is not a comprehensive list of the variations which are possible would be quite possible to combine their functions into a single cache access circuit which performs both look-up and refill.

What is claimed is:

1. A cache system for operating between a processor and a main memory of a computer, the cache system comprising:

a cache memory having a set of cache partitions, each cache partition comprising a plurality of addressable storage locations for holding items fetched from the main memory for use by the processor, a cache partition table holding in association with addresses of items to be cached respective multi-bit partition indicators identifying each cache partition of the set of cache partitions in which the item can be loaded;

a cache refill mechanism arranged to fetch an item from the main memory and to load the item into the cache memory at one of said addressable storage locations, wherein the cache refill mechanism is operable to receive the partition indicators and to allocate to each item fetched from the main memory one or more of the cache partitions in dependence on the address of the item in the main memory; and a cache access circuit which accesses items from the cache memory according to the addresses in main memory of the items and regardless of the cache partition in which the item is held in the cache memory.

2. A cache system according to claim 1, wherein each address in the main memory comprises a page number and a line in page number, and wherein the page numbers are held in the look-up table in association with their respective partition indicators.

3. A cache system according to claim 1, wherein the processor issues addresses comprising a virtual page number in a line in page number, and wherein the system comprises a translation look-aside buffer for translating the virtual page number to a real page number for accessing the main memory, the translation look-aside buffer holding respective partition indicators in association with the real page numbers for identifying each cache partition into which the addressed item can be loaded.

4. A cache system according to claim 2, wherein the line in page number of the item's address is used to identify the address storage location within each cache partition into which the item can be located.

5. A cache system according to claim 3, wherein the line in page number of the item's address is used to identify the address storage location within each cache partition into which the item can be located.

6. A cache system according to claim 2, wherein one or more of the cache partitions is allocated to a page in the main memory.

7. A cache system according to claim 3, wherein one or more of the cache partitions is allocated to a page in the main memory.

8. A cache system according to claim 4, wherein one or more of the cache partitions is allocated to a page in the main memory.

9. The cache system according to claim 1, wherein each respective multi-bit partition indicator identifies whether the item can be loaded into a respective cache partition, for each cache partition of the set of cache partitions.

10. The cache system according to claim 1, wherein each respective multi-bit partition indicator identifies whether the item can be loaded into any cache partition of the set of cache partitions.

11. A method of operating a cache memory arranged between a processor and a main memory of a computer, wherein, when the processor requests an item from the main memory using an address in the main memory for the item and that item is not held in the cache memory, the item is fetched from the main memory and loaded into one of a plurality of addressable storage locations in the cache memory, the addressable storage locations being arranged as a set of cache partitions, and wherein each address is associated with a multi-bit partition indicator identifying each cache partition of the set of cache partitions in which the item can be loaded so that one or more of the cache partitions is allocated to the item in dependence on the address of the item in the main memory, and wherein when the processor requests the item from main memory and the item is held in the cache memory, the item is accessed from the cache memory regardless of the cache partition in which the item is held in the cache memory.

12. A method according to claim 11, wherein each address in the main memory comprises a page number and a line in page number and wherein a plurality of processes are held in the main memory, each process including one or more sequence of instructions held at addresses in the main memory with a common page number.

13. A method according to claim 12, wherein one of the cache partitions is allocated to a process by associating one cache partition with the page numbers of that process in the main memory.

14. A method according to claim 11, wherein the number of addressable storage locations in each cache partition in the set of cache partitions is alterable.

15. A method according to claim 12, wherein the number of addressable storage locations in each cache partition in the set of cache partitions is alterable.

16. A method according to claim 13, wherein the number of addressable storage locations in each cache partition in the set of cache partitions is alterable.

17. A method according to claim 11, wherein the association of the cache partitions to the page numbers is alterable while a process using these page numbers is being run by the processor.

18. A method according to claim 12, wherein the association of the cache partitions to the page numbers is alterable while a process using these page numbers is being run by the processor.

19. A method according to claim 13, wherein the association of the cache partitions to the page numbers is alterable while a process using these page numbers is being run by the processor.

20. A method according to claim 14, wherein the association of the cache partitions to the page numbers is alterable while a process using these page numbers is being run by the processor.

* * * * *